(12) United States Patent
Zätterqvist

(10) Patent No.: US 8,549,976 B2
(45) Date of Patent: Oct. 8, 2013

(54) ARRANGEMENT FOR STORING AND LAUNCHING PAYLOADS

(75) Inventor: Christer Zätterqvist, Uppsala (SE)

(73) Assignee: SAAB AB, Linköping (SE)

( * ) Notice: Subject to any disclaimer, the term of this patent is extended or adjusted under 35 U.S.C. 154(b) by 0 days.

(21) Appl. No.: 13/266,062

(22) PCT Filed: Apr. 23, 2009

(86) PCT No.: PCT/SE2009/050424
§ 371 (c)(1),
(2), (4) Date: Jan. 12, 2012

(87) PCT Pub. No.: WO2010/123423
PCT Pub. Date: Oct. 28, 2010

(65) Prior Publication Data
US 2012/0125183 A1    May 24, 2012

(51) Int. Cl.
*B64D 1/04* (2006.01)
(52) U.S. Cl.
USPC .......................................................... 89/1.51
(58) Field of Classification Search
USPC .................. 89/1.51, 1.58, 1.59, 1.817, 37.16, 89/37.19; 244/129.1, 130, 136, 137.4, 244/137.1
See application file for complete search history.

(56) References Cited

U.S. PATENT DOCUMENTS

| | | | |
|---|---|---|---|
| 3,430,533 A | 3/1969 | Kifor et al. | |
| 3,808,941 A | 5/1974 | Biggs | |
| 4,417,709 A | 11/1983 | Fehrm | |
| 4,679,483 A | 7/1987 | Wrana | |
| H324 H | 9/1987 | Rubin | |
| 4,696,442 A | 9/1987 | Mazzitelli | |
| 5,198,609 A | 3/1993 | Gillman | |
| 5,340,054 A | 8/1994 | Smith et al. | |
| 5,461,960 A | 10/1995 | Marks | |
| 5,699,981 A | 12/1997 | McGrath et al. | |
| 6,098,925 A | 8/2000 | Burdsall, II et al. | |
| 6,619,178 B1 * | 9/2003 | Fransson et al. | 89/1.51 |
| 7,373,886 B2 | 5/2008 | Zatterqvist et al. | |

(Continued)

FOREIGN PATENT DOCUMENTS

| | | |
|---|---|---|
| EP | 1950522 A1 | 7/2008 |
| FR | 2665875 A1 | 2/1992 |
| GB | 191424021 A | 0/1915 |
| WO | WO-00/59782 | 10/2000 |

OTHER PUBLICATIONS

PCT/ISA/210—International Search Report—Dec. 11, 2009.

(Continued)

*Primary Examiner* — Stephen M Johnson
*Assistant Examiner* — John D Cooper
(74) *Attorney, Agent, or Firm* — Venable LLP; Eric J. Franklin

(57) ABSTRACT

An arrangement for storing and launching payloads. An elongate body includes at least one launch opening. The elongate body is configured to store the payloads in compartments. The compartments include openings. The arrangement is configured to be mounted on a vehicle with a longitudinal direction of the elongate body essentially coinciding with a direction of motion of the vehicle. The elongate body includes deflectors configured to act on an air stream and to permanently create an air covering layer across and over the compartment openings during use.

10 Claims, 4 Drawing Sheets

(56) References Cited

U.S. PATENT DOCUMENTS

| | | |
|---|---|---|
| 7,520,467 B2 | 4/2009 | Gioffre et al. |
| 7,600,477 B2 | 10/2009 | Zatterqvist |
| 7,614,334 B2 | 11/2009 | Bellino et al. |
| 7,840,124 B2 | 11/2010 | Olwin |
| 7,866,246 B2 | 1/2011 | Bellino et al. |
| 2004/0104309 A1* | 6/2004 | Segota et al. ............ 244/204 |
| 2004/0200381 A1 | 10/2004 | Zatterqvist |
| 2004/0200382 A1 | 10/2004 | Zatterqvist et al. |
| 2005/0204910 A1 | 9/2005 | Padan |
| 2009/0084253 A1 | 4/2009 | Bellino et al. |
| 2009/0084254 A1 | 4/2009 | Bellino et al. |
| 2012/0125183 A1 | 5/2012 | Zatterqvist |

OTHER PUBLICATIONS

PCT/ISA/237—Written Opinion of the International Searching Authority—Dec. 11, 2009.

PCT/IPEA/408—Written Opinion of the International Preliminary Examining Authority—Mar. 31, 2011.

PCT/IPEA/409—International Preliminary Report on Patentability—Jul. 26, 2011.

* cited by examiner

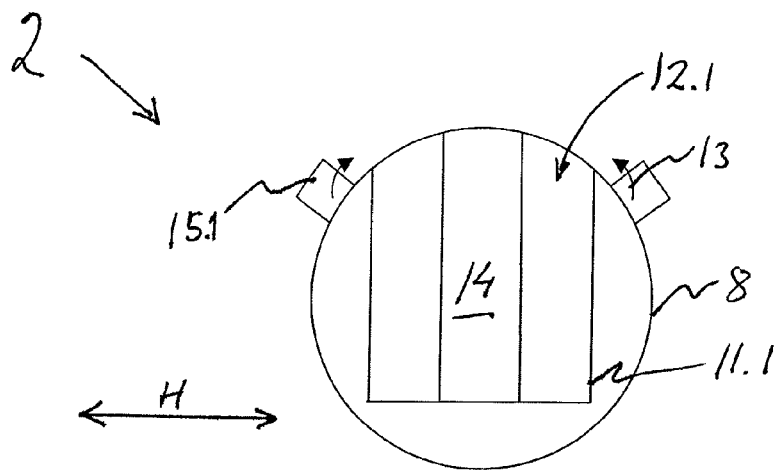
FIG. 4
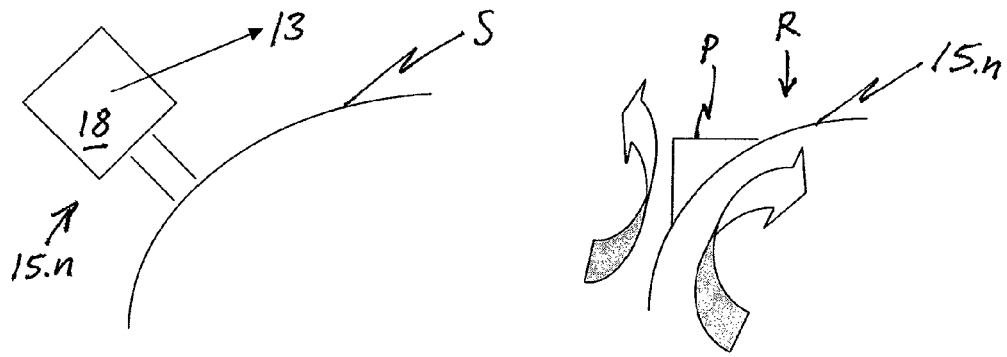
FIG. 5A
FIG. 5B
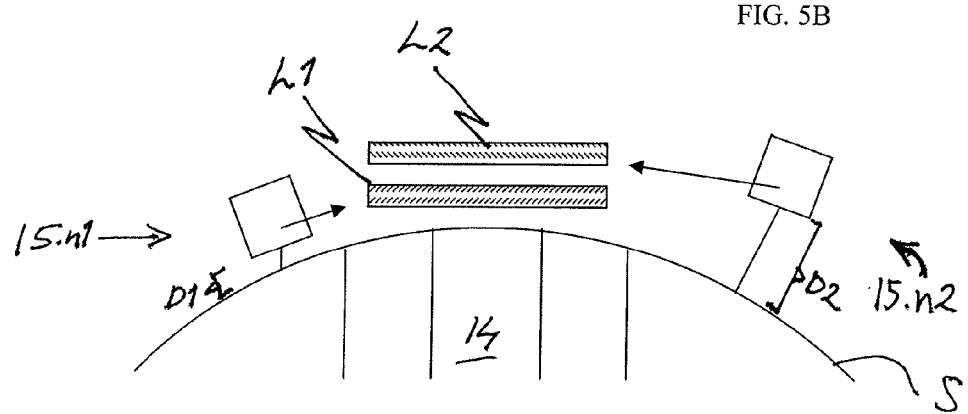
FIG. 5C

ARRANGEMENT FOR STORING AND LAUNCHING PAYLOADS

CROSS-REFERENCE TO RELATED APPLICATIONS

This application is the national phase under 35 U.S.C. §371 of PCT/SE2009/050424 filed 23 Apr. 2009.

TECHNICAL FIELD

The invention relates to an arrangement for storing and launching payloads, in particular an arrangement for storing and launching counter-measures, such as flares and chaff.

BACKGROUND ART

Arrangements for storing and launching payloads, such as counter-measures, being designed to be mounted on vehicles, such as an aircraft of the aeroplane type, are previously known. According to the state of the art, such arrangements comprise an elongate body provided with at least one launch opening. Such arrangements are mounted with the longitudinal direction of the elongate body essentially coinciding with the flight direction of the aircraft. The counter-measures being connected to a firing control unit for feeding firing signals to the counter-measures. The counter-measures can consist of passive means, such as chaff foil, but can also consist of flares, for example IR flares, or other active measures.

One problem is that unfavourable acoustic phenomenon, such as extremely high air induced noise and vibration levels, are generated due to the openings of the compartments, after firing of the counter-measures. The relative wind, due to the speed of the vehicle, interacts with the open, remaining cartridges of the compartments in which the counter-measures have been accommodated. The open compartments can act as barrels which oscillate at its inherent frequency. The acoustic phenomenon could be localised by target-seeking missiles and may also cause damage on the equipment, such as electric components, due to strong vibrations created.

The longitudinal extension and the number of openings of the compartments in the elongated body can be rather large. The protective effect of previously known vortex generators arranged in front of the compartments decreases with increasing length of the openings of the compartments.

Another problem is that previously known sound absorbing means, in arrangements according to the state of the art, generates turbulent flows that are difficult to control and results in high energy losses. The previously known sound absorbing means also contributes to an increased extension of the design of the arrangement in the longitudinal extension of the vehicle.

Yet another problem with the arrangements according to the prior art is the sensitivity for influence of the air flow that is affected by the speed and position of the vehicle.

An example of a previously known arrangement described as a dispenser which is used for launching counter-measures and provided with compartments, is described in document WO-A1-0059782. An elongated body of the dispenser is provided with fixed means, described as a spoiler, in front of the compartments for acting on the air stream and for creating a low dynamic pressure across the compartment openings.

From document U.S. Pat. No. 4,696,442 it is known to provide the exterior surface of an aircraft with a pair of vortex generators arranged right in front of an inlet opening in order to increase the mass airflow into the inlet.

SUMMARY OF THE INVENTION

One object of the present invention is to at least partially eliminate the drawbacks associated with the solutions known in the prior art.

Another object is to minimise the occurrence of acoustic phenomenon which are caused by the openings in compartments which have been emptied of payloads, such as countermeasures.

Yet another object is to prevent the occurrence of vibration disturbances which are primarily caused by inherent oscillations in compartments which have been emptied of payloads.

A further object is to provide an arrangement that is independent of the longitudinal extension and the number of openings of the compartments in the elongated body. Moreover, it is an object with the present invention to provide a solution that has a compact design, that not contributes to high energy losses, and that is insensitive to the position and speed of the vehicle.

Thus, air deflecting means are arranged on the side of the compartments, directing the air flow obliquely and crosswise over the openings, such that a stable laminar flow is provided over the openings. A layer of air is created that covers the openings. The aeroacoustic phenomenon and vibration disturbances are decreased or essentially eliminated.

By generating a laminar air flow over and across the openings, creating an air covering layer, a favourable low drag contribution is obtained. The creation of an air covering layer over and across the compartment openings has been shown to effectively counteract oscillations caused by the inherent frequencies of the compartments, since the laminar air flow near the openings of the compartments means low drag contribution and low energy.

By the arrangement of the air deflecting means according to the present invention, a compact design is reached, and which works independently of the longitudinal extension of the openings and the position of the vehicle, such as an attack or sideslip angle of the aircraft.

According to an embodiment, the elongate body is provided with at least two deflection means arranged in a row in the longitudinal direction of the elongate body. According to yet an embodiment, the elongated body is provided with at least two deflection means, arranged in parallel and in pairs, one on each side of one opening. At least one deflection means can be arranged adjacent and obliquely in front of the most forward opening. The elongated body can be provided with at least one deflection means along the longitudinal side adjacent each opening.

When at least two deflection means are arranged in parallel and in pairs, one on each side of one opening, first deflection means are arranged along one side of the launch opening, for redirecting an air flow to create a first air covering layer over and across the openings of the compartments. Then, second deflection means are arranged along another opposite side of the launch opening, for redirecting an air flow to create a second air covering layer over and across the openings.

The deflection means can be made movable. However, according to a preferred embodiment, the deflection means are fixed to the elongated body. In a further embodiment, a surface area of the deflection means, which surface area is facing the air flow in the direction of motion, can be altered. The rear side of the deflection means can be provided with a protrusion. An air redirecting surface of the deflection means is preferably arranged above the surface of the dispenser.

Further embodiments and advantages are described below with reference to the drawings.

BRIEF DESCRIPTION OF THE DRAWINGS

The invention will be described in greater detail below by way of illustration of embodiments and with reference to the attached drawings, in which:

FIG. 4 shows a schematic cross section view of the arrangement according to FIG. 2, lower picture, along line A-A, and FIG. 5A-C schematically shows various arrangements of air deflectors according to embodiments of the present invention.

DETAILED DESCRIPTION

Figure 1:
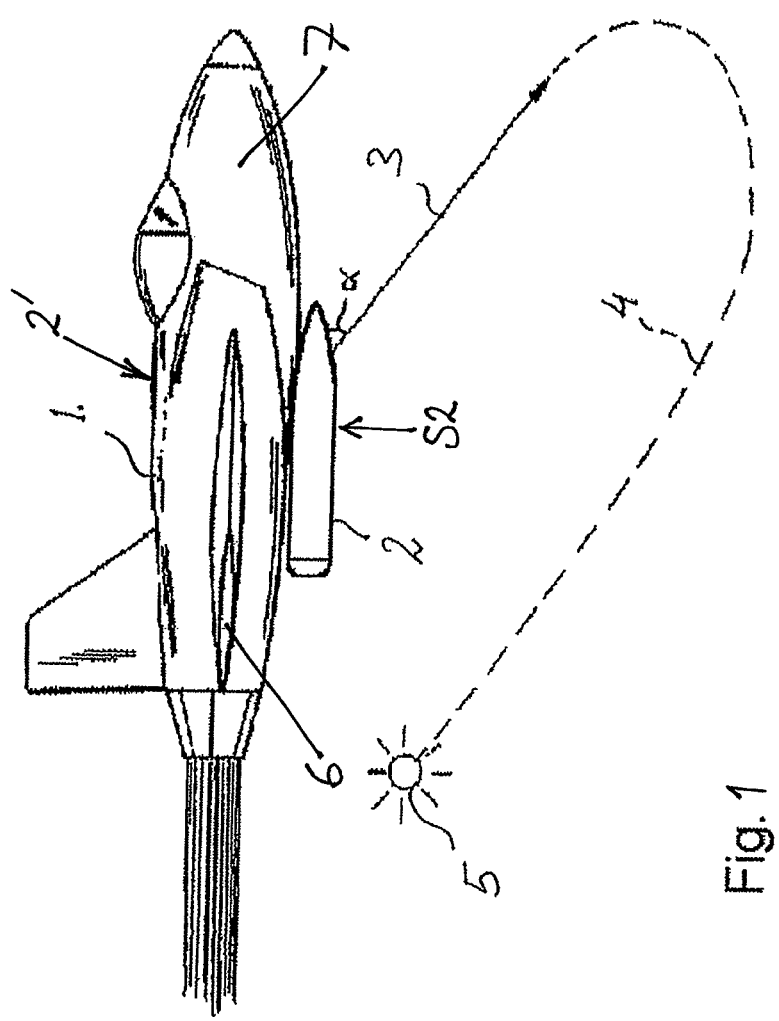
FIG. 1 shows a side view of an aeroplane provided with an arrangement according to an embodiment of the invention for storing and launching counter-measures.

An aeroplane 1 shown in FIG. 1 is provided with an arrangement 2 for storing and launching payloads, hereinafter described as counter-measures 5. The arrangement 2 is hereinafter referred to as the dispenser 2. The dispenser 2 has its longitudinal direction essentially coinciding with the longitudinal direction of the aeroplane 1. An arrow 3 designates the direction of launching from the dispenser 2. The character a designates the launch angle relative to the direction of movement of the aeroplane 1 when the counter-measures 5 are launched obliquely forwards and downwards. The trajectory 4 for a launched flare 5 is indicated by a broken line. During the time from when a flare 5 is activated for launch to when it reaches the position shown in FIG. 1, sufficient time has elapsed for the flare 5 to have become a fully active decoy target in close proximity to the aeroplane 1. According to FIG. 1, the dispenser 2 is placed under a wing 6 near its attachment to the main body 7 of the aeroplane 1. In this context, it should be noted that the dispenser 2 can also be placed further out on the wing 6 or directly on the main body 7 of the aeroplane 1 such as in a dispenser 2' (a suitable position is only indicated by the arrow in FIG. 1) on top of the airplane.

Figure 2:
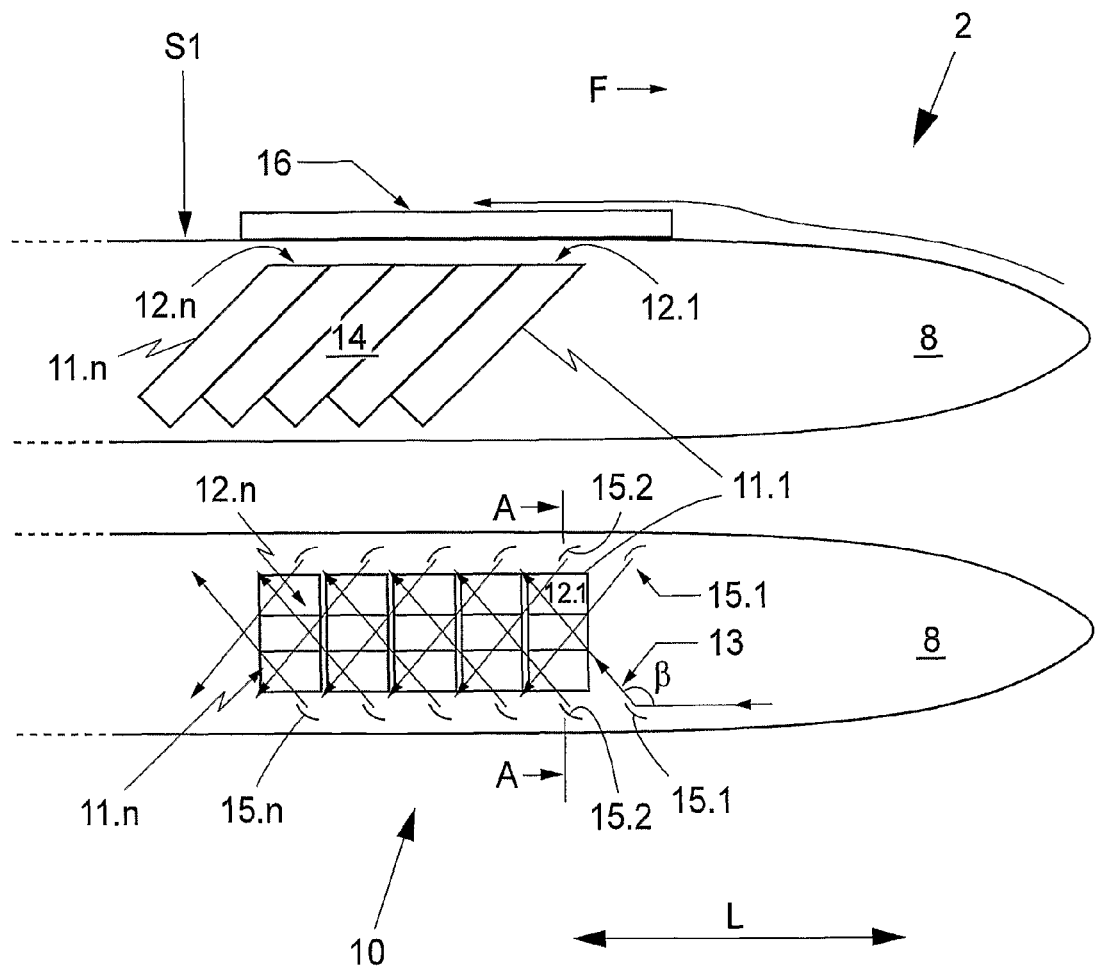
FIG. 2 shows, in the upper picture, a schematic side view of an arrangement according to an embodiment of the invention for storing and launching counter-measures, and in the lower picture a schematic top view of the same arrangement as in the upper picture.

The dispenser 2 is described in more detail with reference to FIGS. 2-3. The dispenser 2 is designed as an elongate body 8, partially shown in FIG. 2, provided with at least one launch opening 10 used for storing the counter-measures 5 in compartments 11.1, 11.2, ..., 11.n. The counter-measures 5 being connected to a firing control unit (not shown) for feeding firing signals to the counter-measures. The compartments 11.1, 11.2, ..., 11.n are provided with openings 12.1, 12.2, ..., 12.n. The counter-measures 5 are preferably accommodated in cartridges 14 which can be of a type known in this field and will therefore not be discussed in detail here. The compartments 11.1, 11.2, ... 11.n can be of the same size or of different sizes and can accommodate identical or different types of counter-measures 5. According to the embodiment disclosed in FIGS. 2-3, the compartments 11.1, 11.2, ... 11.n are arranged side by side in rows creating a matrix pattern. According to the embodiment disclosed in FIGS. 2-3, the compartments 11.1, 11.2, ... 11.n are designed to slope forwards 30° to 60° and preferably about 45° relative to the aeroplane 1, which is depicted in FIG. 2, upper picture. However, the cartridges can be arranged to lie with the opening side essentially perpendicular relative to the openings of the compartments. In principle, all geometrically possible positions can be considered for acting on the direction of launching and may be used.

The elongate body 8 is provided with deflection means. According to the embodiment shown in FIG. 2, there are first deflection means 15.1, a second deflection means 15.2 and a number of additional deflection means 15.n placed on each longitudinal side of the launch opening, for acting on the air stream and for permanently creating an air covering layer 16 across and over the compartment openings 12.1, 12.2, ..., 12.n. The created air covering layer 16, forms an air shield that decreases the acoustic effect/phenomena in the emptied compartments 11.1, 11.2, ..., 11.n when the counter-measures 5 have been launched.

FIG. 2, upper picture, shows the dispenser 2 with the air covering layer 16 on an upper side S1. As described above, the dispenser can be placed under the wing, and consequently this upper side will be positioned on the lower side S2 of the dispenser as illustrated in FIG. 1.

The deflection means 15.1, 15.2 ... 15.n, respectively, hereinafter also denoted as air deflector(s) can be in the form of a nozzle, a wing, a channel, a fin or the similar. According to an embodiment, a respective deflector can be designed to be non-rigid, such that it could collapse when subjected to a high air drag. Each deflector 15.1, 15.2 ... 15.n may also be designed to be foldable and unfoldable. Hence, the deflector(s) 15.1, 15.2 ... 15.n can be movable, such that they can be retracted, unfolded, tilted and/or displaced in any direction, by active control means or automatically due to the air drag.

According to another preferred embodiment, each air deflector 15.1, 15.2 ... 15.n is fixed to the elongated body 8, with a fixed inclined angle towards the flight direction F.

Figure 3A:
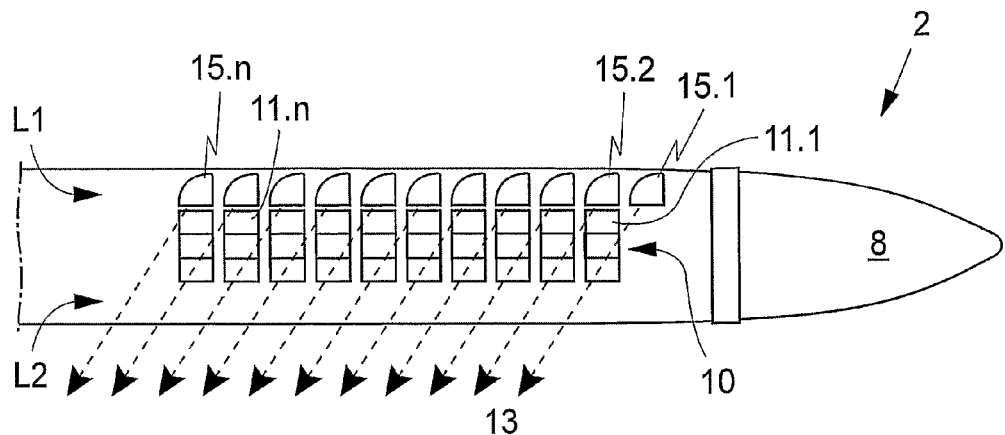
FIG. 3A shows another schematic top view of an arrangement according to a further embodiment of the invention, and in FIG. 3B is shown a schematic top view of yet another embodiment of the arrangement.

FIG. 3A shows an arrangement according to a further embodiment of the invention. According to this embodiment, at least two deflectors 15.1, 15.2 ... 15.n are arranged in a row, along a first longitudinal side L1 of the launch opening 10. Consequently, the other opposite longitudinal side L2 of the launch opening 10 is lacking any deflectors. By redirection of the air flow 13 of the deflectors, one air covering layer is created over the compartments 11.1, 11.2, ..., 11.n. Since only deflectors are arranged along one longitudinal side in a row, there is an advantage with respect to the total air resistance over other solutions having more deflectors that are not in a row.

Figure 3B:
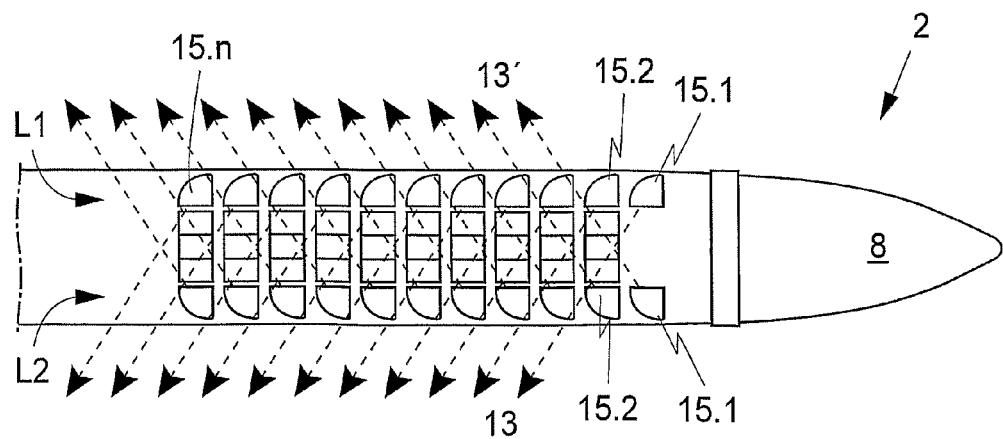

In FIG. 3B is shown a yet another embodiment of the arrangement. According to this embodiment, at least two deflectors 15.1, 15.2 ... 15.n are arranged in a row, along each longitudinal side L1, L2 of the launch opening 10. By redirection of the air flow of the deflectors, on the respective side of the launch opening 10, two air covering layers can be created over the compartments 11.1, 11.2, ..., 11.n. A redirected air flow 13 from a deflector should not interfere with another redirected airflow 13' from an opposite deflector.

As illustrated in FIG. 4, showing a cross sectional view of FIG. 2, lower picture, the deflectors 15.1, 15.2 ... 15.n guide the air flow 13 in a direction over and above the compartments, such that one or more stable, laminar air covering layer(s) 16, also called air boundary layer(s), are formed over the compartments 11.1, 11.2, ..., 11.n. Air flow caused by relative wind, due to the speed of the airplane, meets a front surface of a first deflector 15.1 and is redirected by the design of a front surface of the deflector 15.1 in a direction towards the compartments 11.1, 11.2, . . . , 11.n, obliquely to the horizontal plane H and obliquely to the longitudinal direction L of the dispenser 2 (see FIG. 2, lower picture). The redirection angle β of the air flow 13 in the horizontal plane by the first deflector 15.1, i.e. the deflector positioned closest to the front end of the elongate body 8 as seen in the flight direction F, is in the range between 45° to 180°.

According to the above mentioned embodiments in FIG. 2 and FIG. 3B, the elongated body 8 is provided with at least two deflectors 15.1, arranged in parallel and in pairs, one at each side of one opening 12.1, 12.2, . . . , 12.n. In that respect, the deflectors on one longitudinal side, along a row, are preferably arranged at a first distance from the surface S1. The opposite deflectors of the other side of the launch opening 10, along a row, are arranged at a second distance from the surface S1, apart from the first distance.

A first deflector 15.1 can be arranged adjacent and obliquely in front of the most forward opening 12.1, on one or on each side of the opening 12.1.

According to another embodiment, the elongated body 8 is provided with at least a pair of deflectors 15.1, 15.2, . . . 15.n adjacent each opening 12.1, 12.2, . . . , 12.n. In that respect, the deflectors are arranged such that one air flow that is directed by the first deflectors 15.1, respectively, cross-wise over and across openings 12.1, 12.2, . . . , 12.n of the compartments 11.1, 11.2, . . . , 11.n, is not directed directly towards another deflector too not interfere with second deflectors 15.2, of the compartments 11.1, 11.2, . . . , 11.n.

The deflectors 15.1, 15.2, . . . 15.n are preferably arranged such that the air covering layer 16 is created slightly above the compartments 11.1, 11.2, . . . , 11.n, suitably above the surface S of the elongate body 8, in order to eliminate any possible occurrence of a turbulent flow at the surface. This can be accomplished by arranging an air redirecting surface 18 of the deflector above the surface of the dispenser, as evident from FIG. 5A. The rear side R of the deflector can be provided with a protrusion P to redirect air flow that sticks and follows the back side of the deflector, such that this air flow is not directed over the compartments 11.1, 11.2 . . . 11.n where it can interfere with the created air covering layer 16, which is shown in FIG. 5B.

The surface area, the width and the vertical extension, of each deflector facing the flight direction, are designed in order to reach the desired airflow boundary layer thickness over the compartments. The deflectors 15.1, 15.2, . . . 15.n may be designed with various shapes such as convex, inclined surfaces, or the like.

As mentioned above, a redirected air flow should not interfere with another redirected airflow, since energy is lost due to a decreased air speed and any air covering layer could not be created, or alternatively would be poor. A redirected air flow from one longitudinal side should not interfere with a redirected air flow from the opposite longitudinal side. According to one embodiment of the present invention as evident from FIG. 5C, the problem has been overcome by arranging a first row of deflectors 15.n1 along one longitudinal side of the launch opening 10 at a first distance D1 from the surface of the elongate body 8. A second row of deflectors 15.n2 are arranged along another longitudinal side of the launch opening 10 at a second distance D2 from the surface of the elongate body 8. A redirected air flow from the first row of deflectors 15.n1 creates a first air covering layer L1. A redirected air flow from the second row of deflectors 15.n2 creates a second air covering layer L2. In that respect, the design is insensitive to different positions of the airplane in operation. It is possible to add further air covering layers by arranging additional deflectors such that an additional air covering layer is created.

The invention claimed is:

1. An arrangement for storing and launching counter-measures, comprising:
    an elongate body comprising at least one launch opening configured to store the counter-measures in compartments, the compartments comprising openings, wherein the arrangement is configured to be mounted on an aircraft with a longitudinal direction of the elongate body essentially coinciding with a direction of motion of the aircraft, the elongate body further comprising a plurality of deflectors configured to act on the air stream and to permanently create an air covering layer across and over the compartment openings during use, wherein at least two of the deflectors are arranged in parallel and in pairs, one on each side of one opening, and wherein at least one of the deflectors is arranged along a longitudinal side adjacent each compartment opening.

2. The arrangement according to claim 1, wherein at least two of the deflectors are arranged in a row in the longitudinal direction of the elongate body.

3. The arrangement according to claim 1, wherein at least one of the deflectors is arranged adjacent and obliquely in front of a most forward opening.

4. The arrangement according to claim 1, wherein the deflectors include a first deflector arranged along one side of the launch opening, for redirecting an air flow to create a first air covering layer over and across the openings of the compartments, and a second deflector arranged along another opposite side of the launch opening, for redirecting an air flow to create a second air covering layer over and across the openings.

5. The arrangement according to claim 1, wherein the deflectors are movable.

6. The arrangement according to claim 1, wherein the deflectors are fixed to the elongated body.

7. The arrangement according to claim 1, wherein a surface area of the deflectors that is facing an air flow in the direction of motion, can be altered.

8. The arrangement according to claim 1, wherein a rear side of the deflectors comprises a protrusion.

9. The arrangement according to claim 1, wherein an air redirecting surface of the deflectors is arranged above a surface of the arrangement.

10. An aircraft, comprising:
    a fuselage;
    a wing; and
    at least one arrangement mounted on the fuselage or the wing and comprising an elongate body comprising at least one launch opening, the elongate body being configured to store the counter-measures in compartments, the compartments comprising openings, wherein a longitudinal direction of the elongate body essentially coincides with a direction of motion of the aircraft, the elongate body further comprising a plurality of deflectors configured to act on the air stream and to permanently create an air covering layer across and over the compartment openings during use, wherein at least two of the deflectors are arranged in parallel and in pairs, one on each side of one opening, and wherein at least one of the deflectors is arranged along a longitudinal side adjacent each compartment opening.

* * * * *